(12) United States Patent
Takabayashi et al.

(10) Patent No.: US 7,805,526 B2
(45) Date of Patent: Sep. 28, 2010

(54) INTER-DEVICE AUTHENTICATION SYSTEM, INTER-DEVICE AUTHENTICATION METHOD, COMMUNICATION DEVICE, AND COMPUTER PROGRAM

(75) Inventors: Kazuhiko Takabayashi, Tokyo (JP); Takehiko Nakano, Kanagawa (JP); Yasuaki Honda, Chiba (JP); Tatsuya Igarashi, Tokyo (JP)

(73) Assignee: Sony Corporation, Tokyo (JP)

( * ) Notice: Subject to any disclaimer, the term of this patent is extended or adjusted under 35 U.S.C. 154(b) by 991 days.

(21) Appl. No.: 10/520,975

(22) PCT Filed: Mar. 12, 2004

(86) PCT No.: PCT/JP2004/003336

§ 371 (c)(1),
(2), (4) Date: Jan. 11, 2005

(87) PCT Pub. No.: WO2004/100457

PCT Pub. Date: Nov. 18, 2004

(65) Prior Publication Data
US 2005/0228894 A1      Oct. 13, 2005

(30) Foreign Application Priority Data
May 12, 2003    (JP) .............................. 2003-132903

(51) Int. Cl.
*G06F 15/16* (2006.01)
*H04L 1/16* (2006.01)

(52) U.S. Cl. .................. 709/229; 709/225; 709/228; 709/237; 709/245; 370/245; 370/352; 370/389; 370/401; 370/432

(58) Field of Classification Search ................. 370/254, 370/255, 351, 352, 389, 390, 401, 432, 245
See application file for complete search history.

(56) References Cited

U.S. PATENT DOCUMENTS 5,802,047 A * 9/1998 Kinoshita ................... 370/359

(Continued)

FOREIGN PATENT DOCUMENTS

JP      10-271154      10/1998

(Continued)

OTHER PUBLICATIONS

English translation of Copyright Law of Japan, Article 30, Apr. 2008.

*Primary Examiner*—Ashok B Patel
(74) *Attorney, Agent, or Firm*—Finnegan, Henderson, Farabow, Garrett & Dunner, L.L.P.

(57) ABSTRACT

In view of the connection of a home network to an external network via a home router, using a mechanism that access from the same network is provided with a source MAC address whereas a source address field is rewritten to a MAC address of the router in the case of external access via the router, whether or not access is made from the home network is automatically identified by comparing a MAC address of a device on the other side of communication with a MAC address of the home router. It is capable of suitably managing so that a client terminal uses the contents legitimately acquired on a home server within the scope of private use allowed by the copyright law.

26 Claims, 6 Drawing Sheets

U.S. PATENT DOCUMENTS

| | | | |
|---|---|---|---|
| 5,802,316 A * | 9/1998 | Ito et al. | 709/249 |
| 6,006,272 A * | 12/1999 | Aravamudan et al. | 709/245 |
| 6,931,018 B1 * | 8/2005 | Fisher | 370/401 |
| 2002/0157002 A1 | 10/2002 | Messerges et al. | |
| 2002/0161918 A1 * | 10/2002 | Asano et al. | 709/238 |
| 2003/0018491 A1 | 1/2003 | Nakahara et al. | |
| 2003/0076955 A1 | 4/2003 | Alve et al. | |
| 2004/0215752 A1 * | 10/2004 | Satapati et al. | 709/223 |
| 2005/0100025 A1 * | 5/2005 | Nagami et al. | 370/396 |

FOREIGN PATENT DOCUMENTS

| | | |
|---|---|---|
| JP | 11-203249 | 7/1999 |
| JP | 2001-285283 | 10/2001 |
| JP | 2001-285284 | 10/2001 |
| JP | 2002-073861 | 3/2002 |
| JP | 2002-222172 | 8/2002 |
| JP | 2003-76805 | 3/2003 |
| WO | WO 03/034408 | 4/2003 |

* cited by examiner

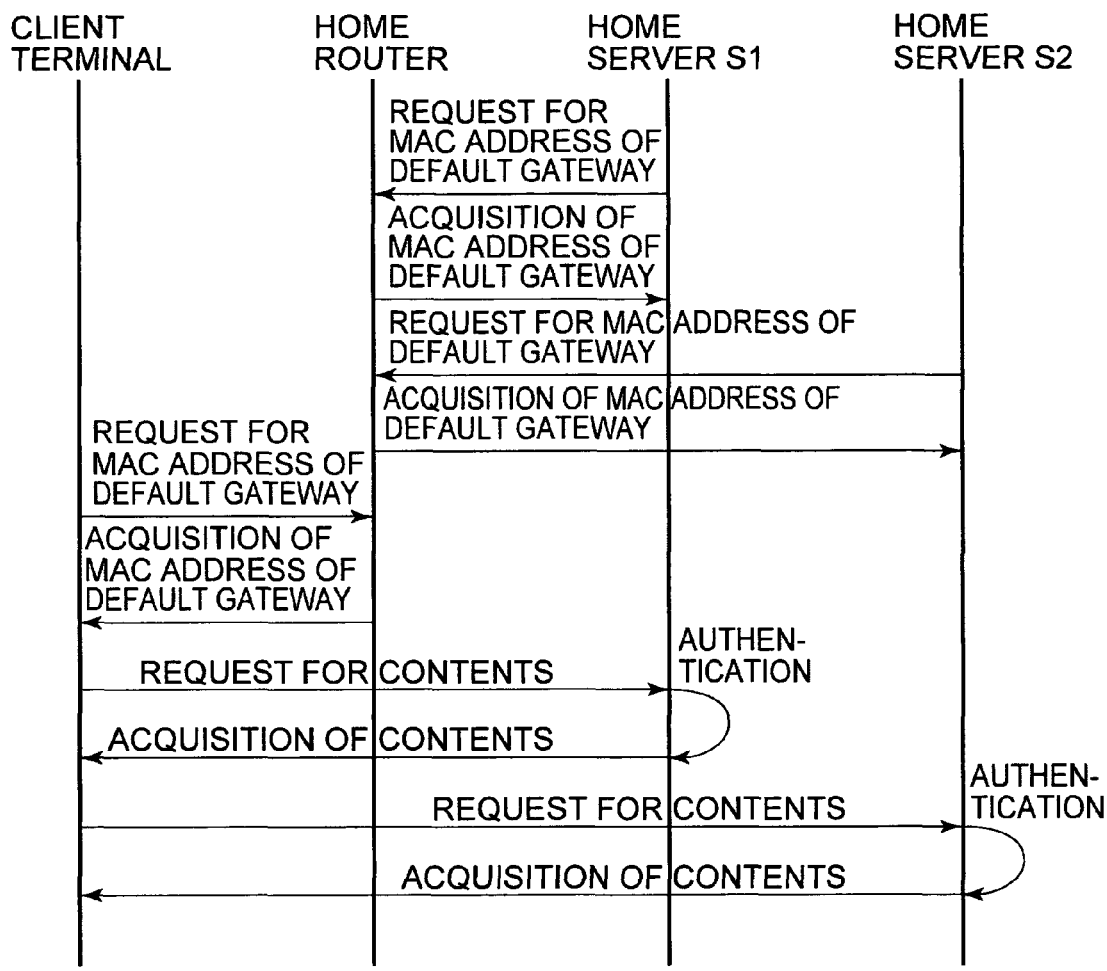

INTER-DEVICE AUTHENTICATION SYSTEM, INTER-DEVICE AUTHENTICATION METHOD, COMMUNICATION DEVICE, AND COMPUTER PROGRAM

TECHNICAL FIELD

The present invention relates to a device-to-device authentication system, a device-to-device authentication method, a communication apparatus and a computer program, for managing the use of the contents between devices such as music data, image data, digital data such as electronic publication, a motion picture or the like, which are distributed by a network or the like, in particular, to a device-to-device authentication system, a device-to-device authentication method, a communication apparatus and a computer program for managing the use of the contents within the scope of private use allowed by the copyright law.

More specifically, the present invention relates to a device-to-device authentication system, a device-to-device authentication method, a communication apparatus and a computer program for managing the use of the contents within the scope of private use allowed by the copyright law on a home network connected to an external network via a router, in particular, to a device-to-device authentication method, a communication apparatus and a computer program for managing so that each client terminal on the home network uses the contents legitimately acquired on a home server within the scope of private use allowed by the copyright law.

BACKGROUND ART

Owing to the recent diffusion of the Internet, various digital contents including a computer file are actively distributed on a network. Moreover, with the spread of a broadband communication network (xDSL (x Digital Subscriber Line), CATV (Cable TV), a wireless network or the like), a mechanism capable of transmitting the distribution of digital data such as music data, image data or electronic publication and even rich contents such as a motion picture without giving any stresses to a user is now being arranged.

On the other hand, the distributed contents are digital data, and therefore, an unauthorized operation such as copy or falsification can be relatively easy to perform. Moreover, a fraud such as the copy or the falsification of the contents is currently frequently committed, which is a main cause of hampering the interest of a digital-content vendor. As a result, a vicious cycle that the price of the contents must be increased to result in the hindrance of diffusion is generated.

For example, recently, the technology of a computer, a network or the like is steadily spreading to general households. An information device such as a personal computer for home use or a PDA (Personal Digital Assistants) and, in addition, various information home appliances such as a television set and a video playback device are interconnected via a home network. In many cases, such a home network is interconnected to an external broadband network including the Internet via a router. After the contents legitimately acquired from a server on the Internet are stored in a server on the home network (hereinafter, referred to as a "home server"), the contents are distributed via the home network to another in-home terminal (client).

Under the copyright law, the contents as copyright work are protected against unauthorized use such as unauthorized copy or falsification. On the other hand, an authorized user is allowed to copy the contents for private use, that is, for personal use, family use or other similar uses within a limited circle (see Copyright Law of Japan, Article 30).

If the scope of private use is applied to the above-described home network, the client terminal connected to the home network is supposed to be within the scope of personal use or family use. Therefore, it is considered that it is appropriate for the client terminal on the home network to make free use of the legitimately acquired contents in the home server (it is apparent that the number of terminals which can enjoy the contents is required to be limited to a certain number).

With a current technique, however, it is difficult to determine whether a client terminal logging into the home network is within the scope of private use or not.

For example, since the home network is interconnected to an external network via a router based on an IP protocol, the home server does not know where a client making access actually is. If the home server provides the contents to external (remote) access, the use of the contents is substantially unrestrained. Therefore, the copyright for the contents is almost unprotected. As a result, a content creator may lose the motivation of the creation.

Furthermore, if the home server allows the client terminal in the home network to use the contents in the same manner, the same client terminal logs into a plurality of home networks at time intervals. As a result, it can use the contents almost unrestrictedly.

On the other hand, if strict restrictions are imposed on the client terminal, a user cannot ensure the private use fundamentally allowed by the copyright law. As a result, the user cannot satisfactory enjoy the contents. Accordingly since the use of a home server or a content-distribution service is not well promoted, the development of content business itself may be impeded.

For example, in consideration of the fact that a user who legitimately purchases copyright work is allowed for free use of it, a method for more easily obtaining consent from an owner of the rights to the contents for the copy and the use of information on a network by the user has been proposed (see, for example, Japanese Patent Application Publication No. 2002-73861). However, this method classifies users depending on the level of relation with the owner of the rights to the use of information and distributes the information by a different distribution method for each level of the relation. This method does not identify the extent of the scope of private use on the network.

Meanwhile, as a protocol constituting the home network, for example, an UPnP (registered trademark) has been known. The UPnP allows easy network construction without any complicated operations and allows a content-providing service between network-connected devices without any difficult operations and setting. Moreover, the UPnP is advantageous in that it is not dependent on an operating system (OS) and the addition of a device is easy.

In the UPnP, network-connected devices exchange a definition file described in an XML (eXtensible Markup Language) format for mutual authentication. The outline of processing of the UPnP is as follows.

(1) Addressing process: its own device ID such as an IP address is acquired.
(2) Discovery process: each device on a network is searched so as to acquire information such as device type or a function contained in a response received from each device.
(3) Service request process: a request is made for a service to each device based on information acquired by the discovery process.

By such a processing procedure, a service can be provided and received using network-connected devices. A device to be connected to the network acquires a device ID by the addressing process and acquires information for other devices on the network by the discovery process, thereby enabling a service request.

The contents stored in the home server can be accessed from other devices on the home network. For example, the contents can be acquired by a device implementing the UPnP connection. If the contents are video data or audio data, a TV or a player is connected as a network-connected device so that a movie or music can be enjoyed.

However, in the device within the home network, for example, in the home server, the contents requiring copyright management such as private contents or pay contents are stored. Therefore, it is necessary to consider the countermeasure against unauthorized access.

It is natural that access from a device of a user having the rights to the use (a license) of the contents is allowed. However, in a home network environment interconnected to the external network via a home router, even a user without a license can get into the home network.

In order to exclude unauthorized access, for example, the home server is made to have a list of clients whose access is allowed so that collation with the list is executed each time access to the home server is requested from a client. In this way, unauthorized access can be excluded.

For example, MAC address filtering is known, which uses a MAC (Media Access Control) address corresponding to a physical address unique to each communication apparatus to set it as an access-allowable device list. More specifically, a MAC address of each device whose access is allowed is registered on a router or a gateway for isolating the internal network such as the home network and the external network from each other. A MAC address assigned to a received packet and the registered MAC address are collated with each other. Access from a device with an unregistered MAC address is refused (see, for example, Japanese Patent Application Publication No. 10-271154).

In order to construct the access-allowable device list, however, it is necessary to check the MAC addresses of all the devices connected to the internal network. Moreover, efforts to input all the acquired MAC addresses so as to create a list are required. Furthermore, in the home network, a connected device is relatively frequently changed. Therefore, the access-allowable device list has to be modified for each such change.

DISCLOSURE OF THE INVENTION

An object of the present invention is to provide preferable device-to-device authentication system, device-to-device authentication method, communication apparatus and computer program, which are capable of suitably managing the use of the contents between devices on a home network connected to an external network via a router.

Another object of the present invention is to provide preferable device-to-device authentication system, device-to-device authentication method, communication apparatus and computer program, which are capable of suitably managing so that each client terminal on a home network uses the contents legitimately acquired on a home server within the scope of private use allowed by the copyright law.

The present invention is devised in view of the above problems. A first aspect thereof is a device-to-device authentication system for authenticating a device on a home network connectable to an external network via a router, characterized by including: local environment management means for confirming whether or not another device making access to the device on the home network is present on the home network.

However, a "system" herein means a logical assembly of a plurality of apparatuses (or functional modules for realizing a specific function), and each apparatus or functional module may be or may not be present in a single box body.

Herein, one of the devices is a home server for legitimately acquiring the contents from the external network via the router or through package media or broadcast reception, whereas the other device is a client for making a request for the contents to the home server for use. After the confirmation of the presence of both the devices on the same home network, the home server provides the contents and/or issues a license for the contents to the client.

Under the copyright law, the contents as copyright work are protected against unauthorized use such as unauthorized copy or falsification. On the other hand, an authorized user is allowed to copy the contents for private use, that is, for personal use, family use or other similar uses in a limited circle.

Accordingly, in the present invention, on the assumption that a client terminal in the home network falls within the scope of private use, only a client under a local environment can use the contents stored on a home server.

Two or more home servers can be installed on the home network. In such a case, since client terminals on the same home network are under a local environment, each home server registers them as members to form a group in an independent manner so as to distribute the contents and to issue a license for the use of the contents. Furthermore, the client terminal can be registered as a member simultaneously on two or more home servers on the same home network to belong to a plurality of groups and can acquire a license of the contents from each of the home servers.

Also in this case, since the client terminal is under a local environment for each of the home servers and therefore is supposed to fall within the scope of personal or family use, it is appropriate for it to make free use of the contents of each of the home serves in the local environment.

On the other hand, even if the client terminal can be registered on a plurality of home servers as a member at the same time, it should not be allowed to belong to a plurality of groups of home servers over a plurality of home networks at time intervals. This is because the connection to another home network corresponds to the move of the client terminal to a remote environment for the first connected home network or the connection to one home network is equivalent to the presence of the client terminal in a remote environment for the other home networks.

Therefore, a client can use the contents acquired from a plurality of home servers on the same home network. However, upon connection to a home server on an other home network, the client can not use the contents acquired from home servers on the home networks other than said other home network.

The local environment management means can confirm the presence or the absence a device making an access request on the same home network by, for example, the identification or the non-identification of a MAC address of a device making an access request with a MAC address of a router set as a default gateway.

The home network is connected to the external network via the home router. If access is made from the same network, a source MAC address is assigned thereto. In the case of external access via the router, however, a source address field is rewritten to the MAC address of the router. Using such an existing mechanism of an IP protocol, a MAC address of the device on the other side of communication is compared with the MAC address of the home router so as to automatically identify if it is access from the home network.

Alternatively, the local environment management means can confirm the presence or the absence on the same home network based on whether or not the respective devices share the same identification information regarding the home network.

For example, each of the devices acquires the MAC address of the router set as the default gateway as identification information regarding the home network. The presence or the absence on the home network is confirmed based on whether or not the devices have the MAC address of the same default gateway.

Alternatively, a local environment management apparatus for supplying network identification information is installed on the home network so that each device acquires a MAC address of the local environment management apparatus as identification information regarding the home network. The presence or the absence on the same network can be confirmed based on whether or not the devices have the MAC address of the same local environment management apparatus.

A second aspect of the present invention is a computer program described in a computer-readable format so as to execute a process for authenticating a device, on a home network connected to an external network via a router, on which a home server for legitimately acquiring the contents from the external network and a client making a request for the contents for use are present, the computer program characterized by including: a local environment management step of confirming whether or not the home server and the client are present on the home network; and a content-provision step of providing the contents and/or issuing a license for the contents to the client by the home server in response to the confirmation of the presence of both the devices on the same home network by the local environment management step.

The computer program according to the second aspect of the present invention defines a computer program described in a computer-readable format so as to realize a predetermined process on a computer system. In other words, the computer program according to the second aspect of the present invention is installed on a computer system, so that a cooperative function is demonstrated on the computer system. As a result, the same effects as those of the device-to-device authentication system according to the first aspect of the present invention can be obtained.

The other objects, features and advantages of the present invention will be apparent from the detailed description based on the following embodiments of the present invention and the accompanying drawings.

BRIEF DESCRIPTION OF DRAWINGS

FIG. 6 is a diagram schematically showing a hardware structure of a host apparatus connected to the home network as a server, a client or the like;

FIG. 7 is a diagram showing an operation sequence on a home network according to the present invention;

FIG. 8 is a diagram showing a structure of a local environment management table;

BEST MODE FOR CARRYING OUT THE INVENTION

Hereinafter, embodiments of the present invention will be described in detail with reference to the drawings.

Under the copyright law, the contents as copyright work are protected against unauthorized use such as unauthorized copy or falsification. On the other hand, an authorized user is allowed to copy the contents for private use, that is, for personal use, family use or other similar uses in a limited circle (see Copyright Law of Japan, Article 30).

On the assumption that a client terminal in a home network (hereinafter, also referred to as a "local environment") falls within the scope of private use, the inventors of the present invention propose a system in which only a client under the local environment can use the contents stored on a home server.

Herein, the definition of the local environment will be described.

Figure 1:
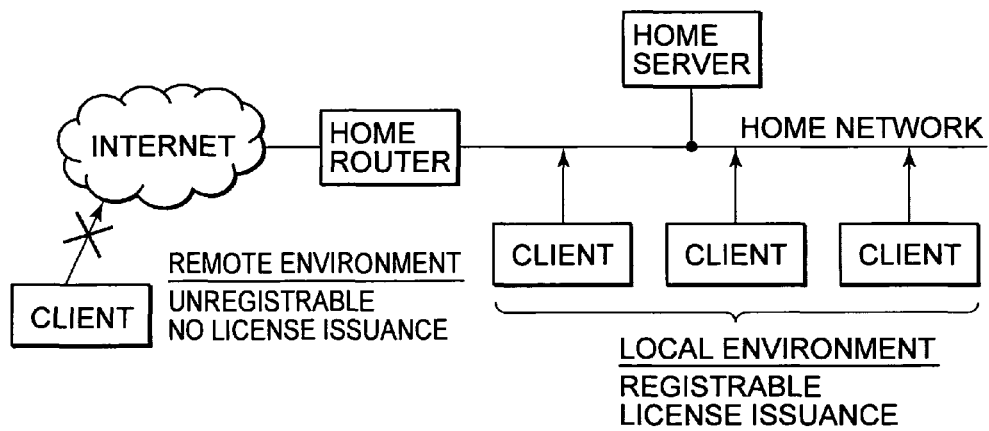
FIG. 1 is a diagram schematically showing a basic structure of a home network.
Figure 2:
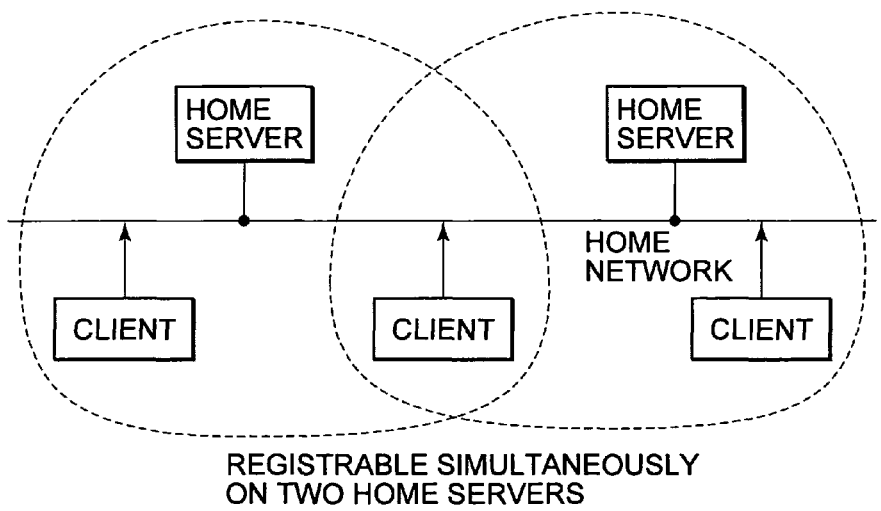
FIG. 2 is a diagram showing an exemplary structure of a home network on which two home servers are present.

FIG. 1 schematically shows a basic structure of a home network. As shown in the drawing, a home network installed in home is connected to an external network such as the Internet via a home router.

On the home network, a home server and at least one client terminal are present. The home server legitimately acquires and stores the contents from a content server on the external network via the home router to distribute the contents in home. It is apparent that the home server can acquire the contents by means other than the network, such as package media or broadcast reception. Each client terminal makes a request for desired contents to the home server so as to acquire them for use.

The client terminals connected to the home network are present under the local environment, and it is supposed that they are within the scope of personal or family use. Therefore, it is considered that it is appropriate for the client terminals on the home network to make free use of the contents legitimately acquired on the home server. Accordingly, the home server registers the client terminals under the local environment as members and issues a license for the contents distribution and the use of the contents. It is apparent that the number of terminals capable of enjoying the contents is required to be limited to a certain number because unlimited connection by the client is not allowable.

Under the local environment, the client terminal acquires the contents from the home server, uses the contents such as for copy or streaming and can also take the contents out of the local environment (into a remote environment) for use.

On the other hand, a client terminal that is not present on the home network, that is, in a remote environment, is not considered to be within the scope of personal or family use. If the client terminal in the remote environment is allowed to use the contents, the use of the contents is substantially unrestrained. As a result, the copyright for the contents is almost unprotected. Therefore, the home server neither registers the client in the remote environment as a member nor issues a license of the contents.

In the example shown in FIG. 1, only one home server is present on the home network. However, it is apparent that two or more home servers may be installed on the same home network so that each of the home servers independently provides a distribution service of the contents in the home network.

In this case, since client terminals on the same home network are under a local environment, each of the home servers independently registers them as members to form a group so as to distribute the contents and to issue a license for the use of the contents. The client terminal acquires the contents from the home server, uses the contents such as for copy or streaming and can also take the contents out of the local environment (into a remote environment) for use.

Furthermore, the client terminal can be registered simultaneously on two or more home servers on the same home network as members to belong to a plurality of groups and can acquire a license of the contents from each of the home servers. In this case, the client terminal is also present under the local environment for the respective home servers and therefore it is supposed that it is within the scope of personal or family use. Therefore, it is considered that it is appropriate for the client to make free use of the contents of each of the home servers in the local environment.

Figure 3:
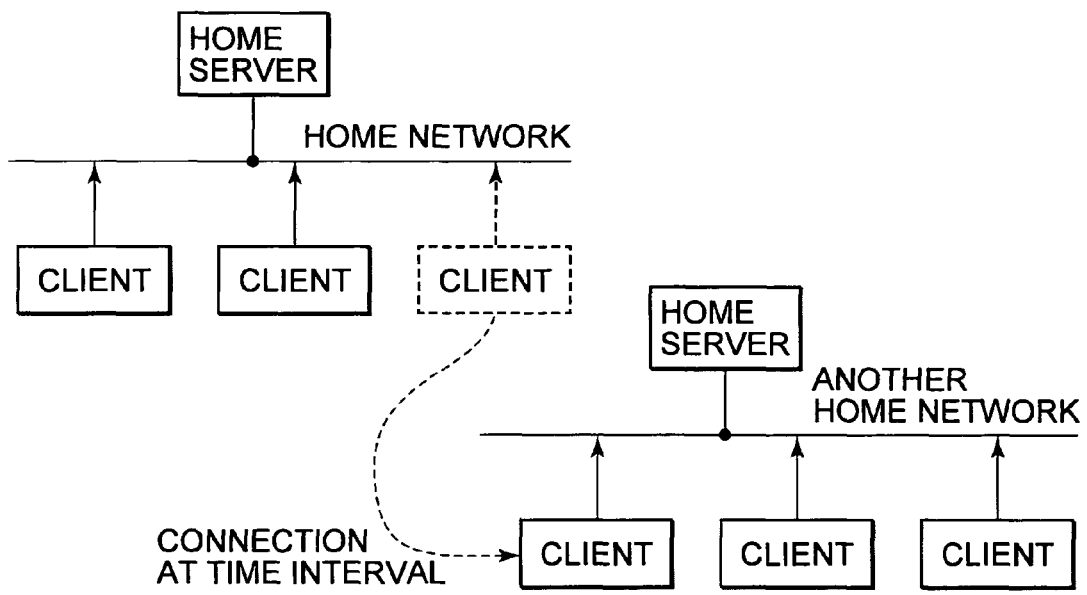
FIG. 3 is a diagram showing a state where a client terminal is connected to a plurality of home networks.

On the other hand, even if the client terminal can be registered on a plurality of home server as a member at the same time, it should not be allowed to belong to a plurality of groups of home servers over a plurality of home networks at time intervals (see FIG. 3).

This is because the connection to another home network is corresponding to the move of the client terminal to a remote environment for the first connected home network or the connection to one home network is equivalent to the presence of the client terminal in a remote environment for the other home networks. The local environment is within the personal or family scope, whereas the remote environment departs from the personal or family scope.

It is technically possible for the client terminal to be connected to a plurality of home networks at time intervals. However, if the use of the contents is successively allowed with the connection, the use of the contents is substantially unrestrained. As a result, the copyright for the contents is almost unprotected.

Summarizing the above, in order to realize a local environment that is supposed to be within the scope of personal or family use on the home network, the followings are derived as necessary conditions.
(1) The home server does not allow member registration from outside of the home network; and
(2) When two or more home servers are present in the same home network, member registration and group management are performed for each of the home servers. Each of the clients on the home network can be registered on two or more home servers. However, the home servers simultaneously accepting the registration must be present in the same home network.

In order to realize such a local environment, a mechanism for identifying whether or not the home server and the client terminal are present on the same home network is required between them.

A current network protocol does not provide any mechanism for identifying a network, such as a home network, by segment. Therefore, in view of the connection of the home network to the external network via the home router, using an existing mechanism of an IP protocol that access from the same network is provided with a source MAC address whereas a source address field is rewritten to a MAC address of a router in the case of external access via a router, the inventors of the present invention propose a method of automatically identifying if access is made from the home network by comparing a MAC address of the device on the other side of communication with a MAC address of the home router.

Hereinafter, embodiments of the present invention will be described in detail with reference to the drawings.

Figure 4:
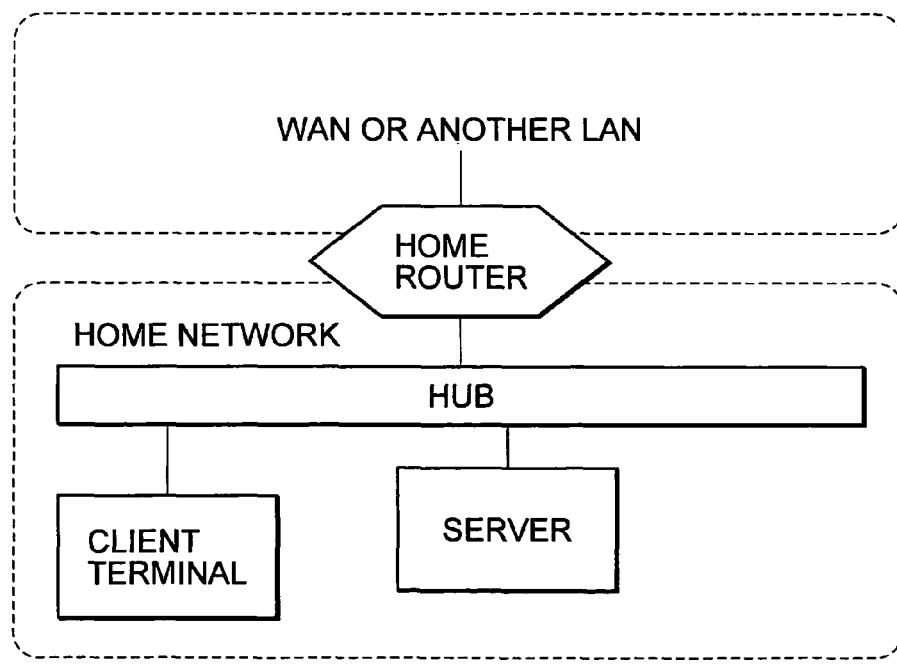
FIG. 4 is a diagram schematically showing a structure of a home network according to one embodiment of the present invention.

FIG. 4 schematically shows a structure of a home network according to an embodiment of the present invention.

A home network installed in home is connected to a WAN such as the Internet or another LAN via a home router. The home router is set as a default gateway of the home network.

The home network is constituted by, for example, connecting a LAN cable of a host apparatus such as a home server or a client terminal to a hub (concentrator).

The host apparatuses on the home network, such as the home server, the client terminal and the home router, and a host apparatus on the external network have MAC addresses, each being unique to a device. The host apparatus transmits and receives a packet including header information containing a destination MAC address and a source MAC address, for example, an Ethernet (registered trademark) frame via the network.

The host apparatuses on the home network, such as the home server and the client terminal, are constituted as, for example, UPnP-compatible devices. In this case, the addition and the deletion of a connected device to/from the network are easy. A device to be connected to the network can enjoy service on the home network such as the use of the contents in accordance with the following procedure.
(1) Addressing process: its own device ID such as an IP address is acquired.
(2) Discovery process: each device on a network is searched so as to acquire information such as device type or a function contained in a response received from each device.
(3) Service request process: A request for a service is made to each device based on information acquired by the discovery process.

On the home network, a local environment that is supposed to be within the scope of personal or family use is formed. Therefore, the home server legitimately acquires and stores the contents from a content server on the external network via the home router to distribute the contents in home. Each of the client terminals is allowed to make a request for desired contents to the home server and acquires them for use.

Under the local environment, the client terminal acquires the contents from the home server and uses the contents such as for copy or streaming. Furthermore, it can take the contents out of the local environment (into the remote environment) for use.

Figure 5:
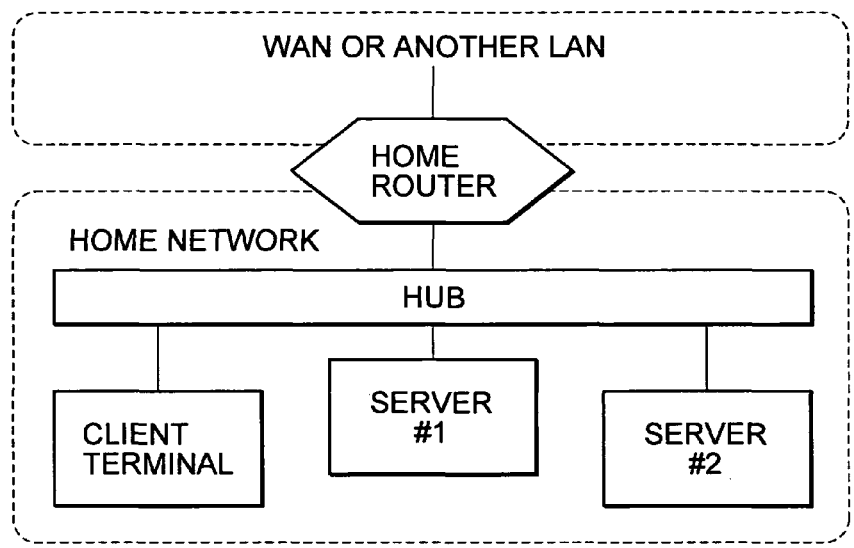
FIG. 5 is a diagram schematically showing a structure of a home network according to another embodiment of the present invention.

FIG. 5 schematically shows a structure of a home network according to another embodiment of the present invention.

The home network is connected to a WAN such as the Internet or another LAN via the home router. In this case, the home router is also set as a default gateway of the home network.

This differs from FIG. 4 in that two home servers are present on the home network. The respective home servers may be simultaneously present on the home network or may be connected at a time interval.

In this case, since the client terminals on the same home network are under the local environment, each of the home servers registers them as members to form a group so as to distribute the contents and to issue a license for the use of the contents. The client terminal acquires the contents from the home server, uses the contents such as for copy or streaming and can also take the contents out of the local environment (into a remote environment) for use. Furthermore, the client terminal can be registered simultaneously on two or more home servers on the same home network as members to belong to a plurality of groups and can acquire a license of the contents from each of the home servers.

Figure 6:
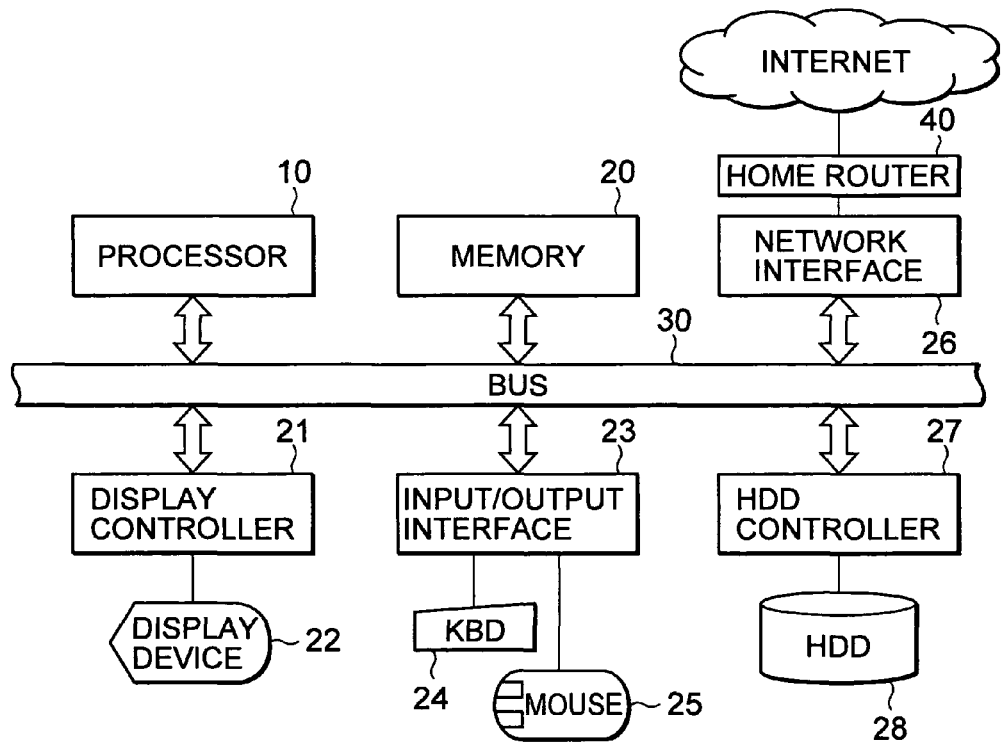

FIG. 6 schematically shows a hardware structure of a host apparatus connected to the home network as a server, a client or the like.

The system is constituted mainly of a processor 10. The processor 10 executes various processes based on a program stored in a memory. The processor controls various peripheral devices connected through a bus 30. The peripheral devices connected to the bus 30 are as follows.

A memory 20 is constituted of a semiconductor memory, for example, a DRAM (Dynamic RAM) or the like and is used to load a program code executed in the processor 10 or to temporarily store operation data of an execution program.

A display controller 21 generates a display image in accordance with a draw command sent from the processor 10 and transmits it to a display device 22. The display apparatus 22 connected to the display controller displays and outputs the image on a screen in accordance with display image information transmitted from the display controller 21.

An input/output interface 23, to which a keyboard 24 and a mouse 25 are connected, transfers an input signal from the keyboard 24 or the mouse 25 to the processor 10.

A network interface 26 is connected to the external network such as a LAN and the Internet and controls data communication through the Internet. Specifically, it transfers data transmitted from the processor 10 to another apparatus on the Internet and receives data transmitted through the Internet so as to pass it to the processor 10.

A hard disk drive (HDD) controller 27, to which a high-capacity external storage apparatus 28 such as an HDD is connected, controls the input and output of data to the HDD 28 to which the HDD controller 27 is connected. The HDD 28 stores a program of an operating system (OS), an application program, a driver program and the like to be executed by the processor. The application program is, for example, a server application for authenticating each client terminal on the home network as the home server or for providing the contents or issuing a license, a client application for use of the contents such as for reproduction of the contents provided by the server or the like, and the like.

In order to constitute the host apparatus, a large number of electric circuits or the like are required in addition to those illustrated in FIG. 6. However, since they are known to those skilled in the art and do not constitute the gist of the present invention, they are omitted in this specification. Moreover, it should be understood that each connection between hardware blocks in the drawing is only partially illustrated in order to avoid the complication of the drawing.

FIG. 7 shows an operation on the home network according to this embodiment. It is assumed that at least a client terminal, two home servers and a home router are present on the network and the home router is set as the default gateway.

The client terminal acquires the contents from the home server and uses the contents such as for copy or streaming.

Prior to the start of a content-distribution service, each home server acquires a MAC address of the default gateway from the home router.

For access to the server, the client terminal first acquires the MAC address of the default gateway and transmits an access request with the acquired MAC address to the server.

The server, to which the access request is made, fetches the source MAC address from a request packet and compares it with the MAC address of the default gateway which is acquired in advance by itself. If it is access from the same network, the source MAC address is assigned thereto. However, if it is external access via the router, the source address field is rewritten to the MAC address of the router. Therefore, based on the identification or non-identification of the source MAC address with the MAC address of the default gateway, it can be easily determined whether or not the request-source client is on the same network, that is, in the local environment. If it is in the local environment, the requested contents are distributed and a license thereof is issued. However, if it is not in the local environment, the request is refused. The use of the contents is allowed between the devices only in the thus formed local environment, thereby effectively restraining the unauthorized distribution of the contents.

Upon reception of a response packet from the request-destination server, the client terminal fetches the MAC address and a server name of the server and stores them with the MAC address of the default gateway acquired prior to the access request as a set in the local environment management table.

FIG. 8 schematically shows a structure of the local environment management table. In the illustrated local environment management table, a record is entered each time a request for the contents is made to a new server. In each record, a LAST flag, a network identification ID, and a MAC address and a server name of a server are stored. As the network identification ID, the MAC address of the default gateway acquired prior to the access to the server is described. As the LAST flag, a flag is set to a record of the last accessed server.

The example illustrated in FIG. 8 shows a history of the client terminal making access to a server S1 on a home network connected to a home router A, access to a server S2 on the home network connected to the home router A, and access to a server S3 on a home network connected to a home router B. The last access made by the client terminal is to the server S2 on the home network connected to the home router A.

The client terminal can be registered simultaneously on two or more home servers on the same home network as members to belong to a plurality of groups and can acquire a license for the contents from each of the home server. This is because, in this case, the client terminal is present under the local environment for each of the home servers and therefore is supposed to be within the scope of personal or family use.

On the other hand, if the client terminal is connected to another home network at a time interval, it corresponds to a move of the client terminal to a remote environment for the first connected home network at that time. The collation of the MAC address of the default gateway obtained by the client terminal upon access to the server on the local environment management table allows the determination of the movement between the home networks.

The client terminal acquires the contents from the home server, uses the contents such as for copy or streaming and can further take the contents out of the local environment (into a remote environment) for use. However, it is not allowable to connect to a plurality of home networks at time intervals so as to use the sequentially acquired contents in an unrestrained manner. Therefore, in this embodiment, the use of the contents on the client terminal is limited to those acquired from the currently connected home network.

The LAST flag in the local environment management table shown in FIG. 8 indicates the last accessed home server. In this embodiment, it is defined that the home network on which the last accessed home server is present is the current local environment for the client terminal. Therefore, it is supposed that the home server having the MAC address of the same default gateway as that of the home server to which the LAST flag is assigned is present in the local environment.

Figure 9:
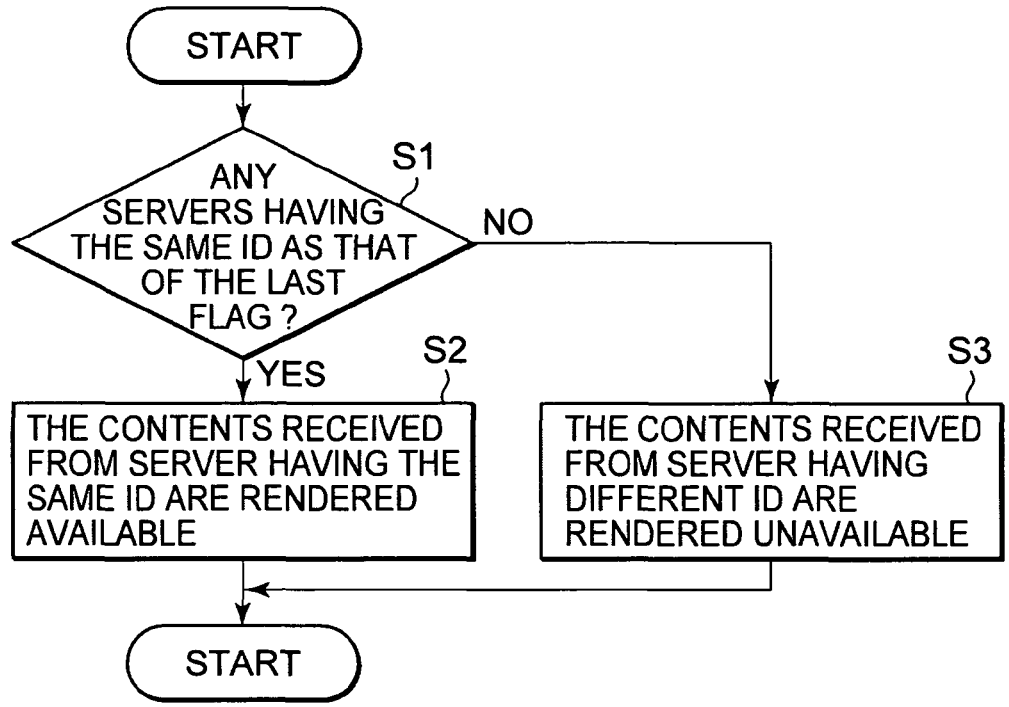
FIG. 9 is a flowchart showing a processing procedure for use of the contents on a client terminal.

FIG. 9 shows a processing procedure for the use of the contents on the client terminal in the form of flowchart. When the contents are to be used (reproduced) on the client terminal, the local environment management table is referred to so as to determine whether or not there are any other servers having the MAC address of the same default gateway as that of the record to which the LAST flag is set (step S1). The contents acquired from the server having the same MAC address are rendered available (step S2), whereas the contents acquired from the other servers are rendered unavailable (step S3).

In the above-described embodiment, using the existing mechanism of the IP protocol that the source MAC address is assigned to the access from the same network while the source address field is rewritten to the MAC address of the router in the case of the external access via the router, the access is automatically identified to be that from the home network or not by comparing the MAC address of the one in communication with the MAC address of the home router. However, a method of identifying the presence of the host apparatus on the same home network is not limited thereto.

Figure 10:
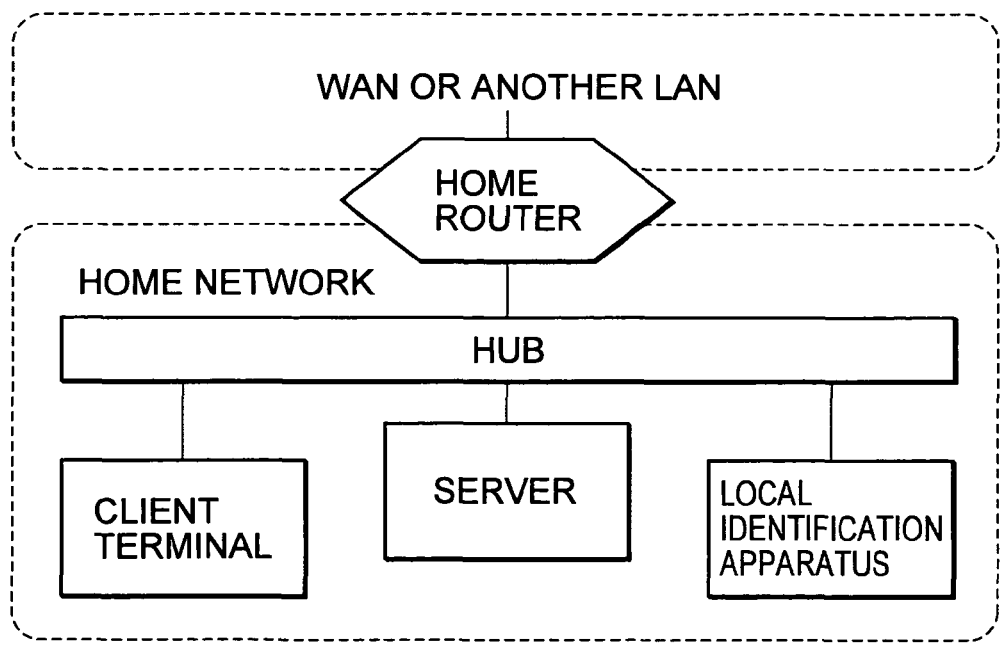
FIG. 10 is a diagram showing a variation of the home network illustrated in FIG. 4.

FIG. 10 shows a variation of the home network shown in FIG. 4. In the illustrated example, the home network is connected to a WAN such as the Internet or to another LAN via the home router. Although the home router is set as the default gateway of the home network, it is optional.

The home network is constituted by connecting a LAN cable of the host apparatus such as the home server or the client terminal to the hub. This embodiment differs from FIG. 4 in that a local identification apparatus for imparting the identification function to the home network is connected to the home network.

The local environment that is supposed to be within the scope of personal or family use is formed on the home network. Therefore, the home server legitimately acquires and stores the contents from the content server on the external network via the home router so as to distribute the contents in home. Each client terminal is allowed to make a request for desired contents to the home server and acquires them for use (idem).

Figure 11:
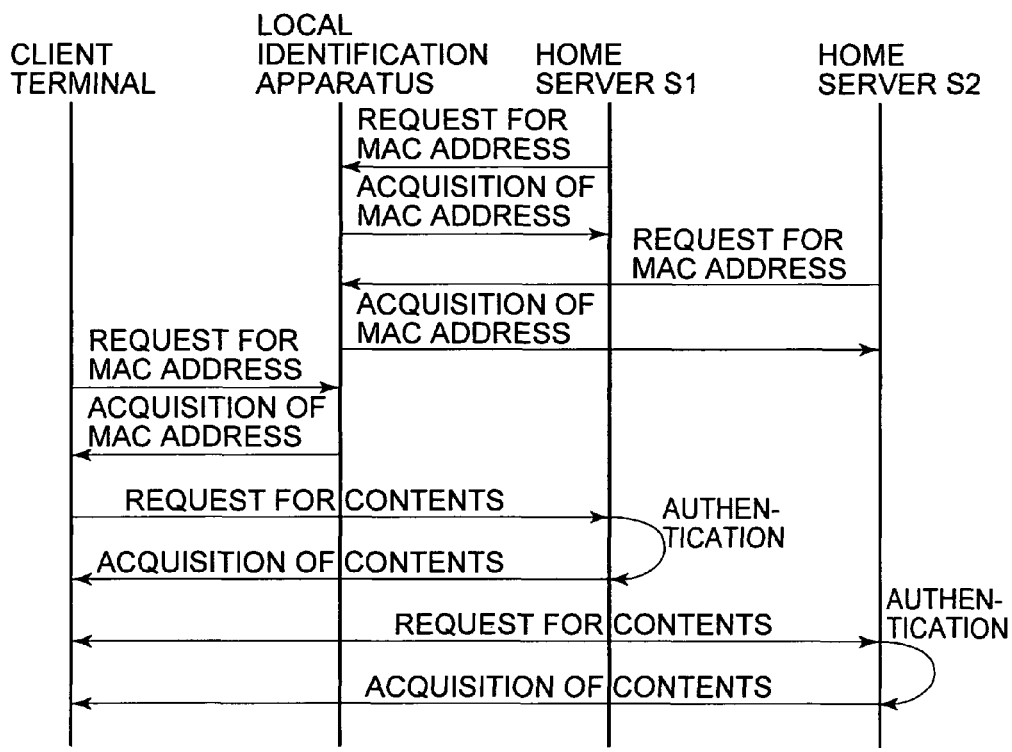
FIG. 11 is a diagram showing an operation sequence on a home network according to the present invention.

FIG. 11 shows an operation on the home network illustrated in FIG. 10.

The client terminal acquires the contents from the home server to use the contents such as for copy and streaming. Prior to the start of a content-distribution service, each home server acquires a MAC address of the local identification apparatus.

For access to the server, the client terminal first acquires the MAC address of the local identification apparatus and transmits an access request with the acquired MAC address to the home server.

The server, to which the access request is made, fetches the MAC address of the local identification apparatus from the request packet and compares it with the MAC address of the local identification apparatus acquired in advance by itself. Then, it is determined in a simple manner whether or not the request-source client is on the home network, that is, in the local environment based on the identification or the non-identification of the two MAC addresses. In the case where it is in the local environment, the requested contents are distributed and a license thereof is issued. In the case where it is not in the local environment, the request is refused. The use of the contents between the devices only in the thus formed local environment is allowed, so that the unauthorized distribution of the contents can be effectively restrained.

Upon reception of a response packet from the request-destination server, the client terminal fetches the MAC address and the server name of the server and stores them with the MAC address of the local identification apparatus acquired prior to the access request as a set in the local environment management table. In each record of the local environment management table in this case, the MAC address of the local identification apparatus is described in place of the MAC address of the default gateway.

Figure 12:
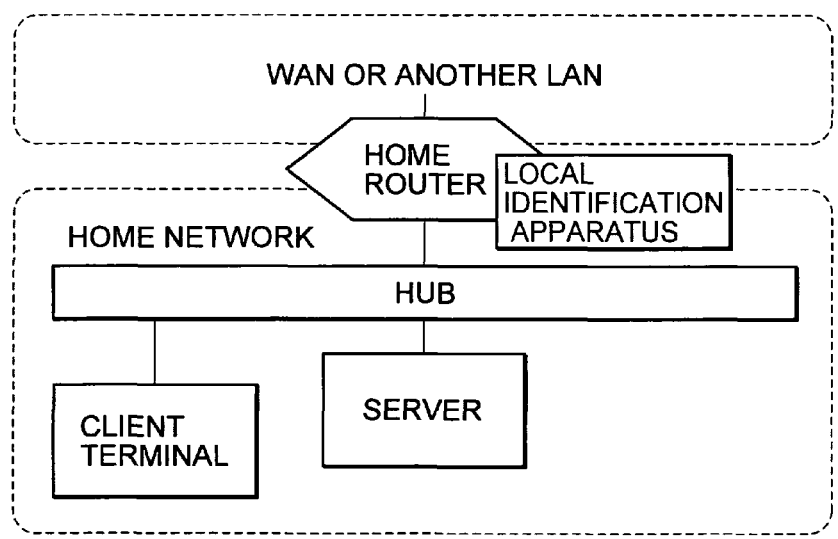
FIG. 12 is a diagram showing a variation of FIG. 10.

FIG. 12 shows a variation of the home network illustrated in FIG. 10. As illustrated, in addition to being connected to the home network as a dedicated device, the local identification apparatus can be constituted to be incorporated into the home router or another host apparatus on the home network.

As a necessary condition of the local identification apparatus, the constant response to a request from the client terminal can be given. For this reason, it is preferred that the local identification apparatus is always powered ON and at least one local identification apparatus exists in home. Since the home server is, for example, a TV set or a video recording/playback apparatus and these devices are not necessarily constantly activated (the local environment cannot be confirmed because they are not powered ON), it is not satisfactory as a requirement for the local identification apparatus. On the other hand, since each household has one refrigerator and the refrigerator is always powered ON, it satisfies the requirement as the local identification apparatus. In addition, since the refrigerator is heavy and therefore is fixed and unmovable, the secondary effect that it is difficult to take it out to commit a fraud can be obtained.

Moreover, two or more local identification apparatuses may be present on a single home network. In this case, the client terminal specifies the local identification apparatus to make a request for authentication. On the contrary, the server specifies the local identification apparatus to make a request for authentication. Alternatively, the client terminal makes a request for authentication to the local identification apparatus while specifying the server so that the local identification apparatus performs the authentication with the server.

The collation of the MAC addresses of the devices is used for the authentication between the devices in the embodiment described in this specification; it is presupposed that the home router and the local identification apparatus have the MAC addresses in such a form that is difficult to falsificate by using encryption means.

Supplement

The present invention has been described in detail above with reference to specific embodiments. However, it is obvious that those skilled in the art can modify or substitute the embodiments without departing from the gist of the present invention. Specifically, the present invention is disclosed only by way of example, and therefore the description of the specification should not be read as limitative. In order to determine the gist of the present invention, the claims should be taken into consideration.

INDUSTRIAL APPLICABILITY

According to the present invention, preferable device-to-device authentication system, device-to-device authentication method, communication apparatus and computer program, which are capable of suitably managing the use of the contents between devices on a home network connected to an external network via a router, can be provided.

Moreover, according to the present invention, preferable device-to-device authentication system, device-to-device authentication method, communication apparatus and computer program, which are capable of suitably managing so that each client terminal on a home network uses the contents legitimately acquired on a home server within the scope of private use allowed by the copyright law, can be provided.

According to the present invention, the use of the contents is allowed between devices only in a local environment, so that the unauthorized distribution of the contents can be effectively restrained.

The invention claimed is:

1. A device-to-device authentication system for authenticating one or more devices on a local area network connectable to an external network via a router, the system comprising:
   a storage unit configured to store a media access control address of a default gateway; and
   a local environment management unit configured to determine when a local area network of a first device and a local area network of a second device are the same local area network by comparing a source media access control address to the media access control address of the default gateway, wherein the first device comprises:
   a unit configured to receive a request for access from the second device;
   unit configured to permit the request when it is determined that the first device and the second device are on the same local area network; and
   a unit configured to refuse the request when it is not determined that the first device and the second device are on the same local area network.

2. The device-to-device authentication system according to claim 1,
   wherein the first device is a home server for legitimately acquiring content, and the second device is a client for making a request for the content to the home server; and
   wherein, in response to determining the devices are both on the same local area network, the home server provides the content or issues a license for the content to the client.

3. The device-to-device authentication system according to claim 1,
   wherein the first device is one of two or more home servers installed on the local area network of the first device;
   wherein the second device is a client; and
   wherein one or more of the two or more home servers can provide the content or issue a license for the content to the client when it is determined to be on the same local area network.

4. The device-to-device authentication system according to claim 3,
   wherein the client is able to receive a provision of the content or issuance of the license for the content from one or more of the two or more home servers on the same local area network.

5. The device-to-device authentication system according to claim 3,
   wherein the client is able to use the content acquired from the two or more home servers on the same local area network, and, upon connection to a home server on a second local area network, the client is not able to use the content acquired from the two or more home servers on the same local area network.

6. A device-to-device authentication system for authenticating one or more devices on a local area network connectable to an external network via a router, the system comprising:
   a storage unit configured to store identification information identifying a local area network of a first device and a local area network of a second device; and
   a unit configured to determine when the local area network of the first device and the local area network of the second device are the same local area network by comparing the identification information identifying the local area network of the first device to the identification information identifying the local area network of the second device,
   wherein the local area network of the first device and the local area network of the second device are determined to be the same local area network when the comparison determines the information identifying the local area network of the first device and the identification information indentifying the local area network ,of the second device are the same;
   wherein the first device comprises:
   a unit configured to receive a request for permission to use a content from the second device;
   a unit configured to permit the request when it is determined that the first device and the second device are on the same local area network; and
   a unit configured to refuse the request when it is not determined that the first device and the second device are on the same local area network.

7. The device-to-device authentication system according to claim 6,
   wherein the first device and the second device acquire a media access control address of a router set as a default gateway as the identification information identifying the local area network of the first device and the second device; and
   whether or not the local area network of the first device and the local area network of second device are the same local area network is determined based on whether or not the first device and the second device have the same media access control address of the default gateway.

8. The device-to-device authentication system according to claim 6, further comprising:
   a local environment management apparatus located on the local area network of the first device and the local area network of the second device for supplying the identification information;
   wherein the first device and second device acquire a media access control address of the local environment management apparatus as identification information identifying the local area network; and
   wherein whether or not the home network of the first device and the home network of second device are the same local area network is determined based on whether or not the first device and the second device have the same media access control address of the local environment management apparatus.

9. A device-to-device authentication method for authenticating one or more devices on a local area network connectable to an external network via a router, the method comprising:

holding a media access control address of a default gateway;

determining when a local area network of a first device and a local area network of a second device are the same local area network by comparing a source media access control address to the media access control address of the default gateway;

wherein the first device performs a method comprising:

receiving a request for access from the second device;

permitting the request when it is determined that the first device and the second device are on the same local area network; and refusing the request when it is not determined that the first device and the second device are on the same local area network.

10. The device-to-device authentication method according to claim 9, wherein the first device is a home server for legitimately acquiring the content, and the second device is a client for making the request for the content to the home server for use; and wherein, in response to determining the first device and the second device are on the same local area network, the home server provides the content and/or issues a license for the content to the client.

11. The device-to-device authentication method according to claim 9, wherein the first device is one of two or more home servers installed on the local area network of the first device;

wherein the second device is a client; and wherein one or more of the two or more home servers can provide the content or issue the license for the content to the client when it is determined to be on the same local area network.

12. The device-to-device authentication method according to claim 11, wherein the client is able to receive a provision of the content or issuance of the license for the content from the two or more home servers on the same local area network.

13. The device-to-device authentication method according to claim 11, wherein the client is able to use the content acquired from the two or more home servers on the same local area network, and, upon connection to a home server on a second local area network, the client is not able to use the content acquired from the two or more home servers on the local area network.

14. A device-to-device authentication method for authenticating one or more devices on a local area network connectable to an external network via a router, the method comprising:

storing identification information identifying a local area network of a first device and a home network of a second device;

determining when the local area network of the first device and the local area network of the second device are the same local area network by comparing the identification information identifying the local area network of the first device to the identification information identifying the local area network of the second device, wherein the local area network of the first device and the local area network of the second device are determined to be the same network when the comparison determines the information identifying the local area network of the first device and the identification information indentifying the local area network of the second device are the same;

wherein the first device performs a method comprising:

receiving a request for permission to use a content from the second device;

permitting the request when it is determined that the first device and the second device are on the same local area network; and refusing the request when it is not determined that the first device and the second device are on the same local area network.

15. The device-to-device authentication method according to claim 14, further comprising:

acquiring by the first device and the second device a media access control address of a router set as a default gateway as identification information regarding the local area network of the first device and the second device; and wherein whether or not the local area network of the first device and the local area network of second device are the same local area network is determined based on whether or not the first device and the second device have the same media access control address of the default gateway.

16. The device-to-device authentication method according to claim 14, wherein:

a local environment management apparatus is located on the local area network of the first device and the local area network of the second device for supplying the identification information; and the first device and the second device acquire a media access control address of the local environment management apparatus as identification information regarding the local area network; and whether or not the local area network of the first device and the local area network of second device are the same local area network is determined based on whether or not the first device and the second device have the same media access control address of the local environment management apparatus.

17. A communication apparatus, comprising:

a storage unit configured to store a media access control address of a default gateway;

a local environment management unit configured to determine when a local area network of a device and a local area network of the communication apparatus are the same local area network by comparing a source media access control address to the media access control address of the default gateway;

a unit configured to receive a request for access from the device;

a unit configured to permit the request when it is determined that the device and the communication apparatus are on the same local area network; and a unit configured to refuse the request when it is not determined that the device and the communication apparatus are on the same local area network.

18. The communication apparatus according to claim 17, wherein the communication apparatus operates as a home server for providing content on the local area network of the communication apparatus; and wherein the communication apparatus further comprises a content-provision unit to provide content or issuing a license for the content only when the communication apparatus and the device are determined to be on the same local area network.

19. A communication apparatus comprising:
a unit configured to store identification information identifying a local area network of the communication apparatus and a local area network of a device;
a unit configured to determine when the local area network of the communication apparatus and the local area network of the device are the same local area network by comparing the identification information identifying the local area network of the communication apparatus to the identification information identifying the local area network of the device, wherein the local area network of the communication apparatus and the local area network of the device are determined to be the same network when the comparison determines the information identifying the local area network of the communication apparatus and the identification information indentifying the local area network of the device are the same;
a unit configured to receive a request for permission to use a content from the device;
a unit configured to permit the request when it is determined that the device and the communication apparatus are on the same local area network; and
a unit configured to refuse the request when it is not determined that the device and the communication apparatus are on the same local area network.

20. The communication apparatus according to claim 19, wherein the determining unit acquires a media access control address of a router set as a default gateway as identification information identifying the local area network of the communication apparatus and the local area network of the device; and
wherein whether or not the device is on the same local area network is determined based on whether or not the device and the communication apparatus acquire the same media access control address of the default gateway.

21. The communication apparatus according to claim 19, wherein a local environment management apparatus for supplying network identification information is installed on the local area network of the communication apparatus and the local area network of the device; and
the local environment management apparatus acquires a media access control address of the local environment management apparatus as identification information regarding the local area network of the communication apparatus and the local area network of the device; and
whether or not the device is on the same local area network is determined based on whether or not the device and the communication apparatus acquire the same media access control address of the local environment management apparatus.

22. A computer-readable storage device, storing a computer program for causing a processor to execute a method for providing content to a first device on a local area network, the method comprising:
determining when the first device and a second device are both on the local area network by comparing a source media access control address to a media access control address of a default gateway;
receiving a request for access from the first device;
permitting the request when it is determined that the first device and the second device are on the same local area network;
refusing the request when it is not determined that the first device and the second device are on the same local area network; and
providing content or issuing a license for the content to the first device by the second device if the first device and the second device are on the local area network.

23. A communication apparatus comprising:
a storage unit configured to store a media access control address of a default gateway;
a local environment management unit configured to determine when a local area network of a device and a local area network of the communication apparatus are the same local area network by comparing a source media access control address to the media access control address of the default gateway; and
a unit configured to send a request for access to the device, wherein the request is permitted when it is determined that the device and the communication apparatus are on the same local area network and the request is refused when it is not determined that the device and the communication apparatus are on the same local area network.

24. The communication apparatus according to claim 23, wherein the communication apparatus operates as a client for making a request for content to a home server for use on the local area network of the communication apparatus; and
wherein the communication apparatus further comprises a content-using unit configured to receive a provision of content or issuance of a license for the content only when the device is the home server and determined to be on the same home network.

25. The communication apparatus according to claim 24, wherein two or more home servers are able to be installed on the local area network of the communication apparatus.

26. The communication apparatus according to claim 24, wherein the content-using unit is able to use the content acquired from a plurality of home servers on the local area network of the communication apparatus, and, upon connection to a home server on a second local area network, the client is not able to use the content acquired from the home servers on the local area network of the communication apparatus.

* * * * *